US012609893B1

(12) United States Patent
Macneil et al.

(10) Patent No.: US 12,609,893 B1
(45) Date of Patent: Apr. 21, 2026

(54) PASSING METADATA ASSOCIATED WITH A PACKET WITHIN A USERSPACE OF A NETWORK DEVICE

(71) Applicant: Juniper Networks, Inc., Sunnyvale, CA (US)

(72) Inventors: Erin C. Macneil, Carp (CA); Amit Kumar Rao, Ontario (CA); Hariprasad Shanmugam, Kanata (CA); Thomas Alexander, Palo Alto, VA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 380 days.

(21) Appl. No.: 18/133,727

(22) Filed: Apr. 12, 2023

(51) Int. Cl.
H04L 45/302 (2022.01)

(52) U.S. Cl.
CPC .................................. H04L 45/306 (2013.01)

(58) Field of Classification Search
CPC ...................................................... H04L 45/306
See application file for complete search history.

(56) References Cited

U.S. PATENT DOCUMENTS

| | | | | |
|---|---|---|---|---|
| 6,675,218 B1 * | 1/2004 | Mahler | ................... | H04L 69/32 |
| | | | | 370/230.1 |
| 12,238,204 B1 * | 2/2025 | Delaney | ................... | H04L 61/10 |
| 2023/0412526 A1 * | 12/2023 | Nallamothu | ............ | H04L 45/50 |

* cited by examiner

*Primary Examiner* — Luat Phung

(74) *Attorney, Agent, or Firm* — Harrity & Harrity, LLP

(57) ABSTRACT

A network device identifies, using a daemon of a userspace of the network device, a packet, and processes, using the daemon, the packet to determine metadata associated with the packet. The network device stores, using the daemon, the metadata and a key value in a data structure. The network device provides, using the daemon, the packet to a kernel of the network device via a virtual interface between the userspace and the kernel, which allows the network device, when using the kernel, to process the packet and to provide the packet to an application of the userspace via a socket. Storing the metadata and the key value in the data structure allows the network device, when using the application of the userspace, to retrieve the metadata from the data structure based on receiving the packet from the kernel via the socket.

20 Claims, 12 Drawing Sheets

100

200

Network
220

Network
device
210-1

Network
device
210-N

300

Bus
310

Processor
320

Memory
330

Input
Component
340

Output
Component
350

Communication
Component
360

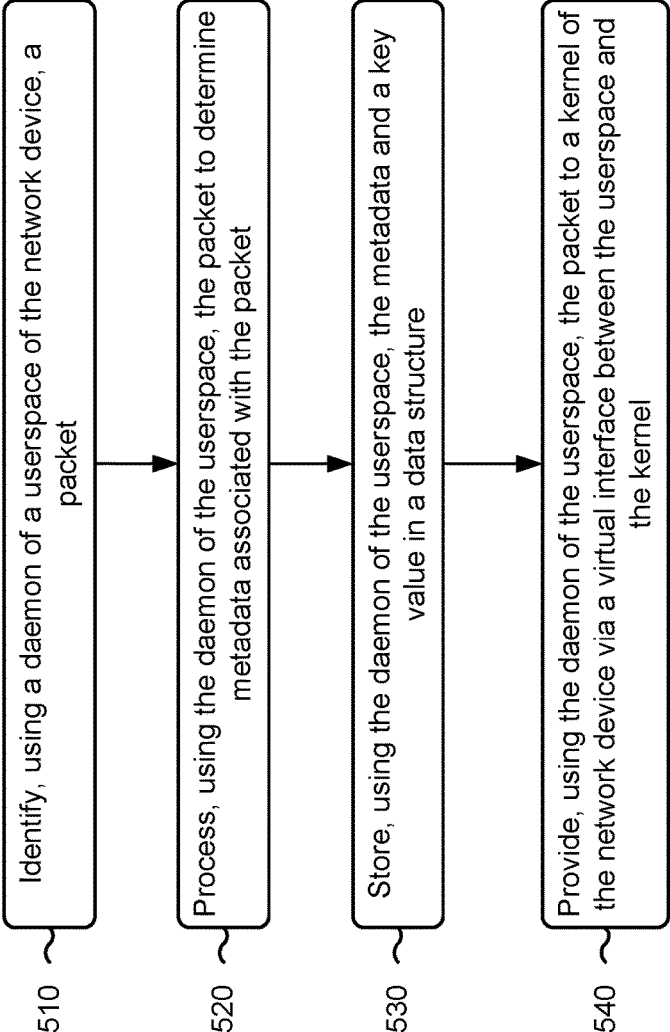

510   Identify, using a daemon of a userspace of the network device, a packet

520   Process, using the daemon of the userspace, the packet to determine metadata associated with the packet 530   Store, using the daemon of the userspace, the metadata and a key value in a data structure 540   Provide, using the daemon of the userspace, the packet to a kernel of the network device via a virtual interface between the userspace and the kernel

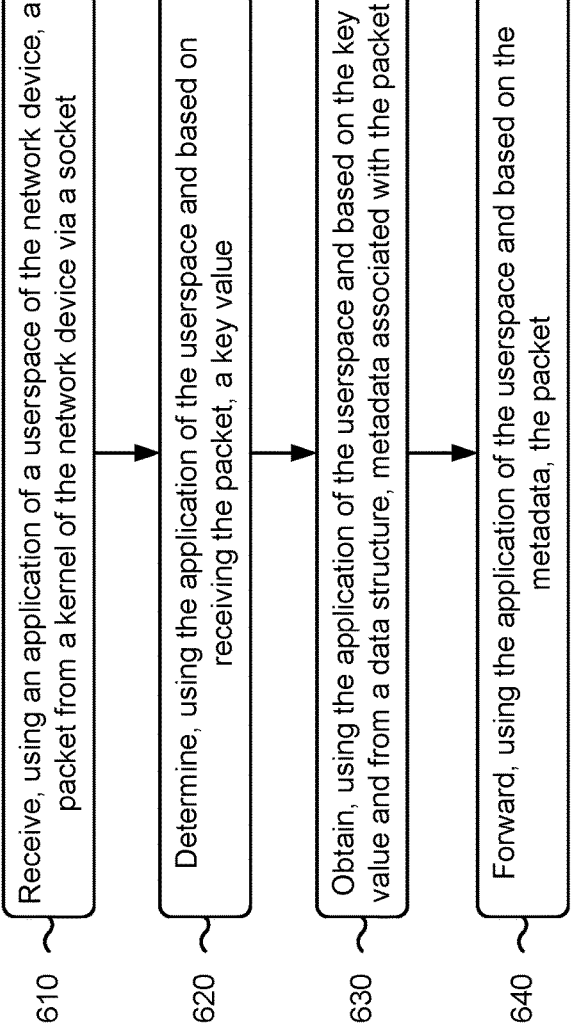

610 Receive, using an application of a userspace of the network device, a packet from a kernel of the network device via a socket 620 Determine, using the application of the userspace and based on receiving the packet, a key value 630 Obtain, using the application of the userspace and based on the key value and from a data structure, metadata associated with the packet 640 Forward, using the application of the userspace and based on the metadata, the packet

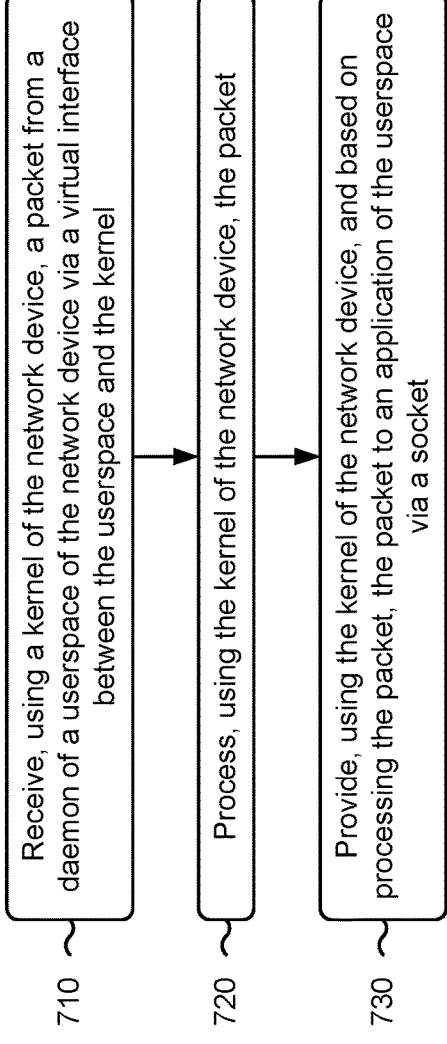

700

710 Receive, using a kernel of the network device, a packet from a daemon of a userspace of the network device via a virtual interface between the userspace and the kernel 720 Process, using the kernel of the network device, the packet 730 Provide, using the kernel of the network device, and based on processing the packet, the packet to an application of the userspace via a socket

FIG. 7

PASSING METADATA ASSOCIATED WITH A PACKET WITHIN A USERSPACE OF A NETWORK DEVICE

BACKGROUND

A network device can partition computing resources between a userspace of the network device and a kernel of the network device. In some cases, the kernel can include computing resources that are allocated to an operating system of the kernel that manages hardware and/or mediates access to computing resources of the network device. The user space can include computing resources for general application software (e.g., for routing) and/or components.

SUMMARY

In some implementations, a method includes identifying, by a network device, using a daemon of a userspace of the network device, a packet; processing, by the network device, using the daemon of the userspace, the packet to determine metadata associated with the packet; storing, by the network device, using the daemon of the userspace, the metadata and a key value in a data structure; and providing, by the network device, using the daemon of the userspace, the packet to a kernel of the network device via a virtual interface between the userspace and the kernel, wherein providing the packet to the kernel of the network device allows the network device, when using the kernel, to process the packet and to provide the packet to an application of the userspace via a socket, and wherein storing the metadata and the key value in the data structure allows the network device, when using the application of the userspace, to retrieve the metadata from the data structure based on receiving the packet from the kernel via the socket.

In some implementations, a network device includes one or more memories, and one or more processors to: receive, using an application of a userspace of the network device, a packet from a kernel of the network device via a socket, determine, using the application of the userspace and based on receiving the packet, a key value; obtain, using the application of the userspace and based on the key value and from a data structure, metadata associated with the packet; and forward, using the application of the userspace and based on the metadata, the packet.

In some implementations, a non-transitory computer-readable medium storing a set of instructions includes one or more instructions that, when executed by one or more processors of a network device, cause the network device to: receive, using a kernel of the network device, a packet from a daemon of a userspace of the network device via a virtual interface between the userspace and the kernel; process, using the kernel of the network device, the packet; and provide, using the kernel of the network device, and based on processing the packet, the packet to an application of the userspace via a socket.

BRIEF DESCRIPTION OF THE DRAWINGS

FIG. 5 is a flowchart of an example process associated with passing metadata associated with a packet within a userspace of a network device.

FIG. 6 is a flowchart of an example process associated with passing metadata associated with a packet within a userspace of a network device.

FIG. 7 is a flowchart of an example process associated with passing metadata associated with a packet within a userspace of a network device.

DETAILED DESCRIPTION

Figure 1A:
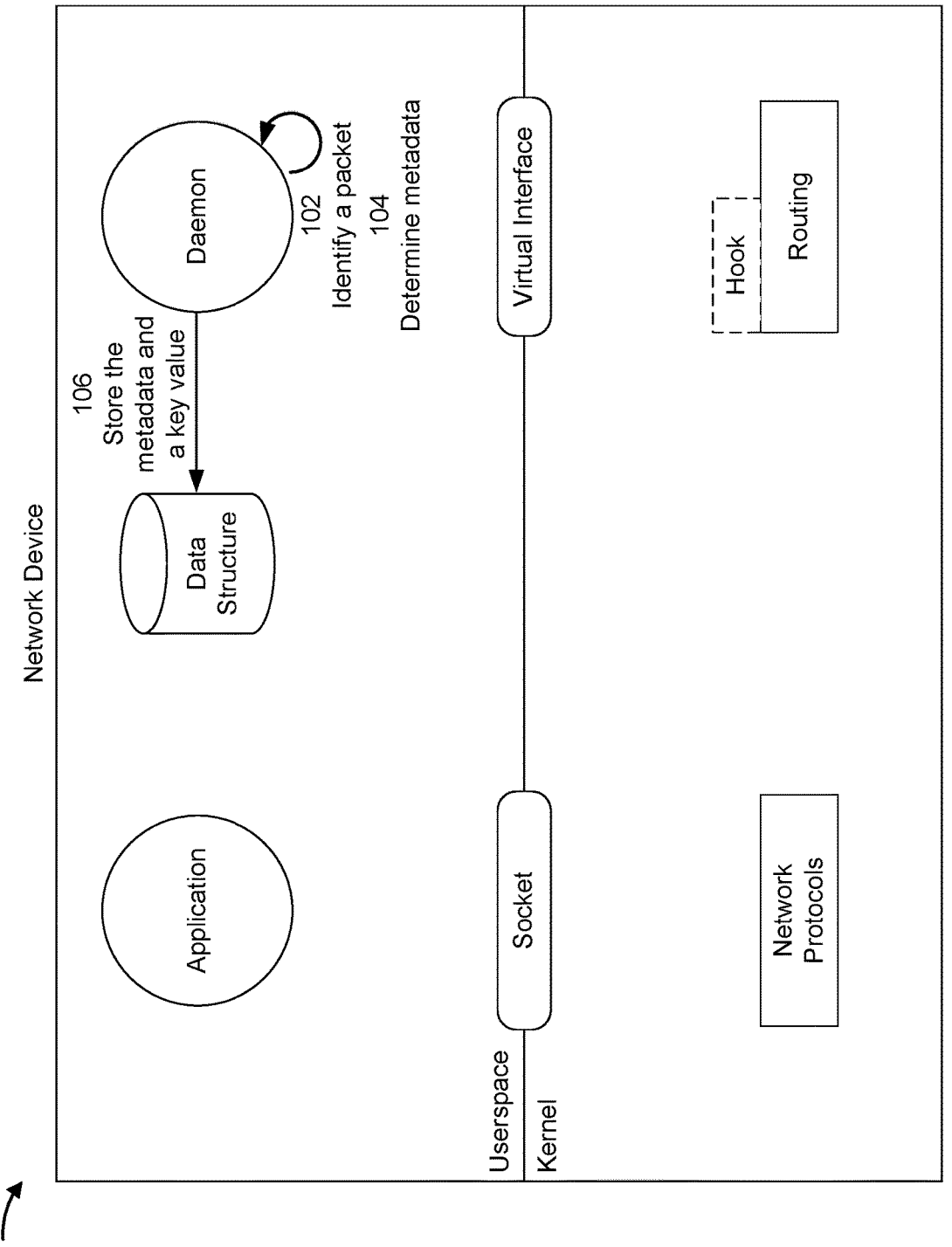
FIGS. 1A-1F are diagrams of an example implementation associated with passing metadata associated with a packet within a userspace of a network device.

The following detailed description of example implementations refers to the accompanying drawings. The same reference numbers in different drawings may identify the same or similar elements.

In many cases, due to security considerations, applications running in the userspace are unable to propagate metadata associated with packets to the kernel of the network device. As a result, these applications are unable to control and/or influence routing decisions in connection with the packets (without use of other components, such as loadable kernel modules). There is a need, therefore, for sharing metadata associated with a packet within the userspace of the network device, without passing the metadata to the kernel of the network device, to facilitate greater control and/or influence on routing decisions associated with the packets.

In some implementations described herein, a network device includes a userspace and a kernel. The userspace may include a daemon and an application. The daemon may provide a packet to the kernel of the network device (e.g., to allow the packet to undergo kernel processing), which allows the packet to be provided to the application. The daemon stores metadata associated with the packet, along with a key value, in a data structure.

In some implementations, the daemon may process the packet (e.g., using a hashing technique), to determine the key value. Accordingly, the application, upon receiving the packet from the kernel, may process the packet (e.g., using the hashing technique) to determine the key value. The application then may perform a lookup, based on the key value, in the data structure to obtain the metadata. Alternatively, in some implementations, the daemon includes the key value in the packet, prior to providing the packet to the kernel. The kernel may then process the packet to generate ancillary data that indicates the key value. The kernel may then provide the packet (e.g., with the key value removed) and the ancillary data to the application. Accordingly, the application, upon receiving the packet and the ancillary data from the kernel, may process the ancillary data to determine the key value. The application then may perform a lookup, based on the key value, in the data structure to obtain the metadata.

Accordingly, some implementations described herein allow the metadata to be passed from the daemon to the application within the userspace of the network device, without the metadata passing into the kernel of the network device. This allows the application to forward the packet based on the metadata, which is not otherwise possible without potentially comprising the kernel (e.g., by sending metadata to the kernel), or including other components (e.g., loadable kernel module or other components) in the network device. Accordingly, some implementations described herein enable greater control and/or influence on routing decisions associated with the packet than are otherwise available.

Additionally, in some implementations described herein, the application may provide a packet to the kernel of the network device (e.g., to allow the packet to undergo kernel processing), which allows the packet to be provided to the daemon. The application stores metadata associated with the packet, along with a key value, in the data structure. The application also provides (e.g., in association with providing the packet) ancillary data that indicates the key value to the kernel. The kernel may then process, based on the ancillary data, the packet to include the key value, and may provide the packet (e.g., with the key value added) to the daemon. Accordingly, the daemon, upon receiving the packet from the kernel, may process the packet to determine the key value. The daemon then may perform a lookup, based on the key value, in the data structure to obtain the metadata.

Accordingly, some implementations described herein allow the metadata to be passed from the application to the daemon within the userspace of the network device, without the metadata passing into the kernel of the network device. This allows the daemon to modify the packet (e.g., to encapsulate the packet with the metadata) and/or forward the packet based on the metadata, which is not otherwise possible without comprising the kernel (e.g., by sending metadata to the kernel), or including other components (e.g., loadable kernel module or other components) in the network device. Accordingly, some implementations described herein enable greater control and/or influence on routing decisions associated with the packet than are otherwise available.

FIGS. 1A-1F are diagrams of an example implementation 100 associated with passing metadata associated with a packet within a userspace of a network device. As shown in FIGS. 1A-1F, example implementation 100 includes a network device, which is described in more detail below in connection with FIGS. 2-4.

The network device may include a userspace and a kernel. As shown in FIGS. 1A-1F, the userspace may include an application (e.g., for generating and/or routing packets), a data structure (e.g., for storing metadata associated with packets), and/or a daemon (e.g., for routing packets), as further described herein; and the kernel may include a network protocols component (e.g., that is associated with a network protocol stack), a routing component (e.g., for transmitting packets within the kernel), and/or a hook component (e.g., for analyzing and/or modifying packets), as further described herein.

As shown in FIG. 1A, and by the reference number 102, the network device, using the daemon of the userspace, may identify a packet. The packet may include metadata, which may indicate one or more details about the packet. For example, the metadata my include type length value (TLV) metadata, information that identifies the packet's destination, a route associated with the packet's destination, and/or other information. The packet may include the metadata in one or more headers of the packet (e.g., the packet is encapsulated with the metadata), or the metadata may be included in a payload of the packet. In some implementations, the network device, using the daemon of the userspace, may generate the packet, or, alternatively, may receive the packet (e.g., from another network device).

As shown by reference number 104, the network device, using the daemon of the userspace, may determine the metadata. For example, the network device (e.g., using the daemon) may process (e.g., read and/or parse) the packet to determine the metadata. In some implementations, the network device (e.g., using the daemon) may remove the metadata from the packet in association with determining the metadata. For example, the network device (e.g., using the daemon) may de-encapsulate the packet to remove the metadata from the packet (e.g., remove the one or more headers of the packet that include the metadata) and may thereby determine the metadata.

As shown by reference number 106, the network device, using the daemon of the userspace, may store the metadata and a key value. For example, as shown in FIG. 1A, the network device (e.g., using the daemon) may store the metadata and the key value in the data structure of the userspace. The data structure may be a key-value store, a database, a table, or another type of data structure that is included in and/or accessible to the userspace of the network device. The network device (e.g., using the daemon) may store the metadata and the key value in an entry of the data structure (e.g., such that the key value is a "key" or "index" of the entry).

In some implementations, the network device (e.g., using the daemon) may generate the key value (e.g., prior to storing the key value). For example, the network device (e.g., using the daemon) may process, using a hashing technique (e.g., a message-digest (MD) hashing technique, such as an MD5 hashing technique; a secure hash algorithm (SHA) hashing technique; and/or another hashing technique), the packet to determine the key value. The network device (e.g., using the daemon) may process (e.g., using the hashing technique) one or more portions of the packet (e.g., a subset of an addressing component of the packet and/or a subset of a payload of the packet, among other examples) to determine the key value. Alternatively, the network device (e.g., using the daemon) may select the key value. For example, the network device (e.g., using the daemon) may select the key value from a group of available, unique key values. The key value may have a particular length, such as 32 bits, 64 bits, 128 bits, or 256 bits.

Figure 1B:
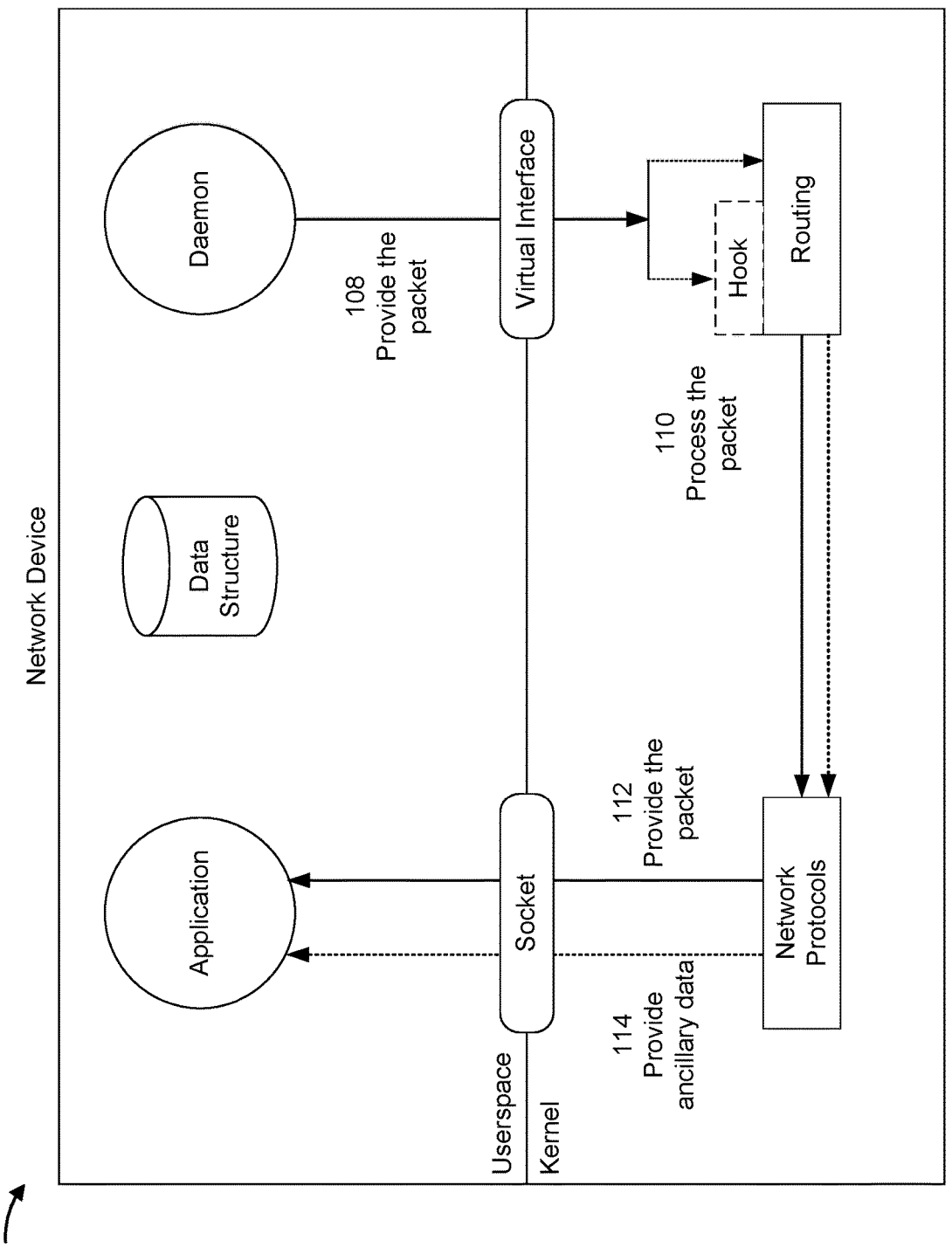

As shown in FIG. 1B, and by reference number 108, the network device, using the daemon of the userspace, may provide the packet to the kernel of the network device. In some implementations, the network device (e.g., using the daemon) may provide the packet to the kernel via a virtual interface between the userspace and the kernel, such as a Linux TUN and/or TAP interface (e.g., that are associated with a virtual network device, such as a TAP device, of the kernel). For example, the network device (e.g., using the daemon) may invoke a write function (e.g., a "write( )" function in Linux) associated with the virtual interface to provide the packet to the kernel.

The packet, when provided to the kernel, may not include the metadata (e.g., because the network device, using the daemon, removed the metadata from the packet, as described herein in relation to FIG. 1A). Additionally, or alternatively, the network device (e.g., using the daemon) may process the packet to include the key value before providing the packet to the kernel of the network device. For example, the network device (e.g., using the daemon) may append the key value to an end of the packet to include the key value in the packet. In this way, a last particular number of bits (e.g., a last 32 bits, 64 bits, 128 bits, or 256 bits) of the packet may be associated with the key value.

As shown by reference number 110, the network device, using the kernel of the userspace, may process the packet. For example, the network device may use one or more of the network protocols component, the routing component, and/or the hook component to process the packet, as described herein.

In some implementations, to process the packet, such as when the packet does not include the key value (e.g., the key value is not appended to the packet), the network device, using the routing component of the kernel, may determine whether the packet is associated with a host (e.g., an origin and/or destination of the packet for which the routing component has routing information). The network device (e.g., using the routing component) may drop the packet (e.g., based on determining that the packet is not associated with a host), or may add the packet to a queue (e.g., based on determining that the packet is associated with a host). The queue may be, for example, a socket-buffer queue (e.g., a Linux skb socket-buffer queue) for a socket (e.g., that is associated with the host).

Additionally, or alternatively, to process the packet, such as when the packet includes the key value (e.g., the key value is appended to the packet), the network device, using the hook component of the kernel, may determine that the packet includes the key value. For example, the network device (e.g., using the hook component) may parse and/or read the packet to identify the key value. Accordingly, the network device (e.g., using the hook component), may remove the key value from the packet, and may generate ancillary data that indicates the key value. For example, the hook component may be an extended Berkeley packet filter (eBPF) that processes the packet to remove the key value from the packet and that generates ancillary data (e.g., an SO_MARK message in Linux) that indicates the key value. The network device (e.g., using the routing component of the kernel) then may determine whether the packet is associated with a host, as described above. The network device (e.g., using the routing component) may drop the packet (e.g., based on determining that the packet is not associated with a host), or may add the packet to the queue (e.g., based on determining that the packet is associated with a host). Additionally, the network device (e.g., using the hook component) may add the ancillary data to the queue (e.g., based on determining that the packet is associated with a host), in association with the packet.

As shown by reference number 112, the network device, using the kernel of the userspace, may provide the packet to the application of the userspace. In some implementations, the network device (e.g., using the network protocols component) may provide the packet to the application of the userspace via the socket (e.g., that is associated with the queue when the queue is a socket-buffer queue). For example, the network device (e.g., using the network protocols component), may invoke a receive function (a "recvmsg( )" function in Linux) associated with the socket to provide the packet to the application. In some implementations, the network device (e.g., using the network protocols component) may remove the packet from the queue, determine the socket via which the packet is to be sent, and send the packet to the socket (and thereby provide the packet to the application of the userspace).

As shown by reference number 114, the network device, using the kernel of the userspace, may provide the ancillary data to the application of the userspace (e.g., when the ancillary data is included in the queue in association with the packet). In some implementations, the network device (e.g., using the network protocols component) may provide the ancillary data to the application of the userspace via the socket. For example, the network device (e.g., using the network protocols component), may invoke the receive function associated with the socket to provide the packet to the application. In some implementations, the network device (e.g., using the network protocols component) may remove the ancillary data from the queue (e.g., when removing the packet from the queue), determine the socket via which the ancillary data is to be sent, and send the ancillary data to the socket (e.g., in association with the packet) (and thereby provide the ancillary data, in association with the packet, to the application of the userspace).

Accordingly, the network device, using the application of the userspace, may receive the packet, and, in some implementations, the ancillary data (e.g., in association with receiving the packet), from the kernel of the network device (e.g., via the socket).

Figure 1C:
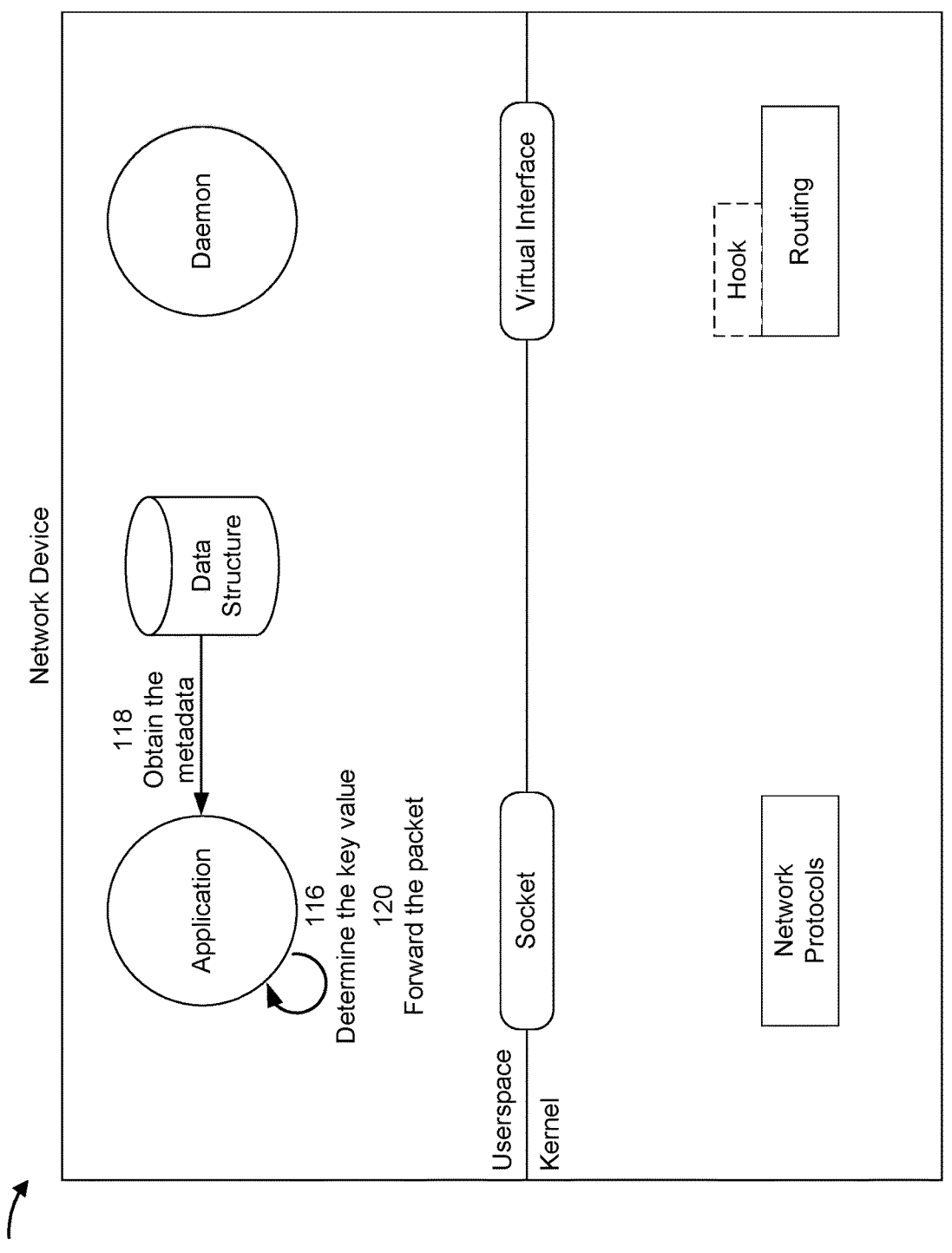

As shown in FIG. 1C, and by reference number 116, the network device (e.g., using the application) may determine the key value (e.g., based on receiving the packet and/or the ancillary data). For example, when the packet is provided to the application, and not any ancillary data, the network device (e.g., using the application) may process, using a hashing technique (e.g., the same hashing technique that was used to generate the key value) the packet to determine the key value. As an alternative example, when the ancillary data is provided to the application (e.g., in association with the packet), the network device (e.g., using the application) may process (e.g., parse and/or read) the ancillary data to determine the key value.

As shown by reference number 118, the network device, using the application of the userspace, may obtain the metadata (e.g., that is associated with the packet). In some implementations, the network device (e.g., using the application) may obtain the metadata from the data structure based on the key value. For example, the network device (e.g., using the application) may search the data structure for an entry associated with the key value (e.g., for an entry "keyed to" or "indexed with" with the key value), may thereby identify the entry associated with the key value, and may process (e.g., parse and/or read) the entry to obtain the metadata from the entry. In this way, the metadata may be passed (e.g., from the daemon to the application) within the userspace of the network device, without passing into the kernel of the network device.

As shown by reference number 120, the network device, using the application of the userspace, may forward the packet. In some implementations, the network device (e.g., using the application) may forward the packet based on the metadata. For example, when the metadata includes information that identifies the packet's destination, or a route associated with the packet's destination, the network device (e.g., using the application) may forward the packet in accordance with that information.

Figure 1D:
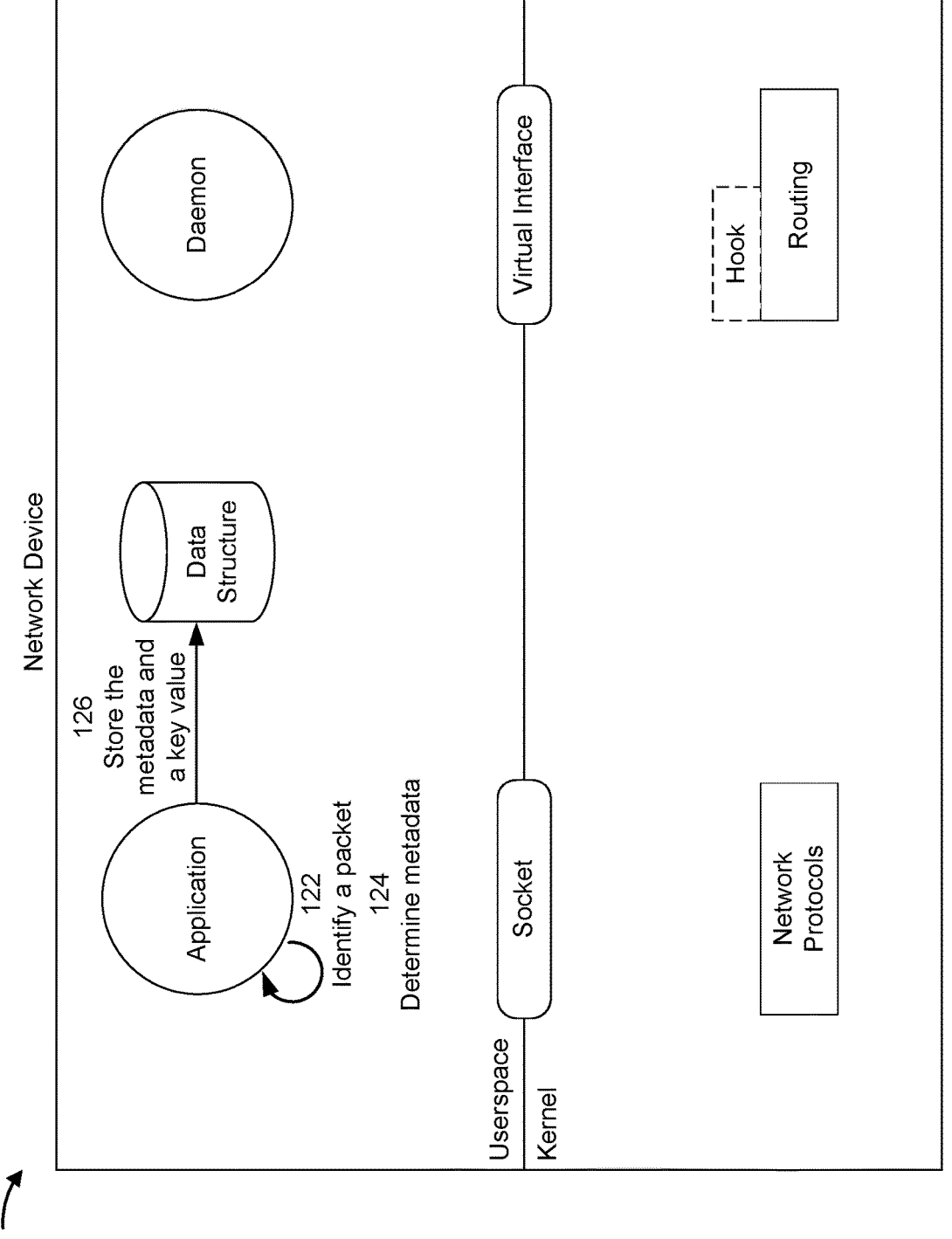

As shown in FIG. 1D, and by reference number 122, the network device, using the application of the userspace, may identify a packet (e.g., a packet that is different than the packet described herein in relation to FIGS. 1A-1C). In some implementations, the network device (e.g., using the application) may generate the packet, or, alternatively, may receive the packet (e.g., from another network device).

As shown by reference number 124, the network device, using the application, may determine metadata associated with the packet. The metadata may indicate one or more details about the packet. For example, the metadata my include TLV metadata, information that identifies the packet's destination, a route associated with the packet's destination, and/or other information. The metadata may not be included in the packet. Accordingly, in some implementations, the network device (e.g., using the application) may determine the metadata by performing a lookup (e.g., based on at least some of the packet), such as in a forwarding information base (FIB) of the userspace of the network device.

As shown by reference number 126, the network device, using the application of the userspace, may store the metadata and a key value (e.g., a different key value than the key value described herein in relation to FIGS. 1A-1C). For example, as shown in FIG. 1D, the network device (e.g., using the application) may store the metadata and the key value in the data structure of the userspace. The network device (e.g., using the application) may store the metadata and the key value in an entry of the data structure (e.g., such that the key value is a key or index of the entry).

In some implementations, the network device, using the application of the userspace, may select the key value (e.g., prior to storing the key value). For example, the network device (e.g., using the application) may select the key value from a group of available, unique key values. The key value may have a particular length, such as 32 bits, 64 bits, 128 bits, or 256 bits.

Figure 1E:
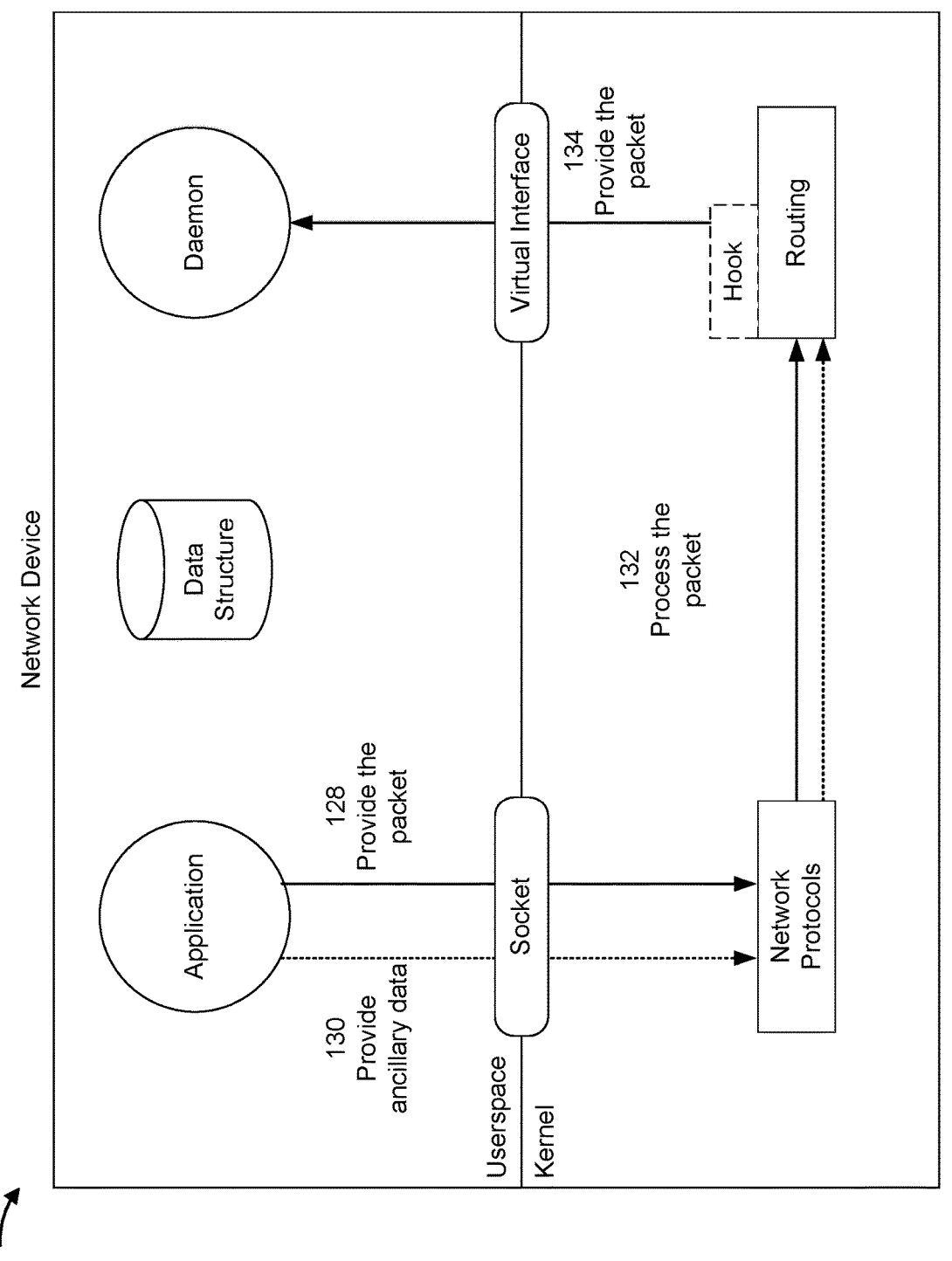

As shown in FIG. 1E, and by reference number 128, the network device, using the application of the userspace, may provide the packet to the kernel of the network device. In some implementations, the network device (e.g., using the application) may provide the packet to the kernel via a socket. For example, the network device (e.g., using the application), may invoke a send function (e.g., a "sendmsg( )" function in Linux) associated with the socket to provide the packet to the kernel.

As shown by reference number 130, the network device, using the application of the userspace, may provide ancillary data that indicates the key value to the kernel of the network device. The network device (e.g., using the application) may generate the ancillary data (e.g., may generate an SO_MARK message in Linux). In some implementations, the network device (e.g., using the application) may provide the ancillary data to the kernel via the socket. For example, the network device (e.g., using the application) may invoke the send function associated with the socket to provide the ancillary data to the kernel. The network device (e.g., using the application) may provide the ancillary data to the kernel in association with providing the packet to the kernel. Accordingly, the network device, using the kernel of the userspace, may receive the packet, and, in some implementations, the ancillary data (e.g., in association with receiving the packet), from the application of the network device (e.g., via the socket).

As shown by reference number 132, the network device, using the kernel of the userspace, may thereby process the packet. For example, the network device may use one or more of the network protocols component, the routing component, and/or the hook component to process the packet, as described herein.

In some implementations, to process the packet, the network device (e.g., using the network protocols component of the kernel) may add the packet and the ancillary data to the queue (e.g., the socket buffer queue). The network device (e.g., using the routing component) may remove the packet and the ancillary data from the queue. The network device (e.g., using the hook component) then may process the packet to include the key value. For example, the network device (e.g., using the hook component) may append the key value to an end of the packet to include the key value in the packet.

As shown by reference number 134, the network device, using the kernel of the userspace, may provide the packet to the daemon. In some implementations, the network device (e.g., using the routing component) may provide the packet to the daemon via a virtual interface, such as a Linux TUN and/or TAP interface between the userspace and the kernel (e.g., that are associated with a virtual network device, such as a TAP device of the kernel). For example, the network device (e.g., using the routing component), may invoke a write function associated with the virtual interface to provide the packet to the daemon. Accordingly, the network device, using the daemon of the userspace, may receive the packet from the kernel.

Figure 1F:
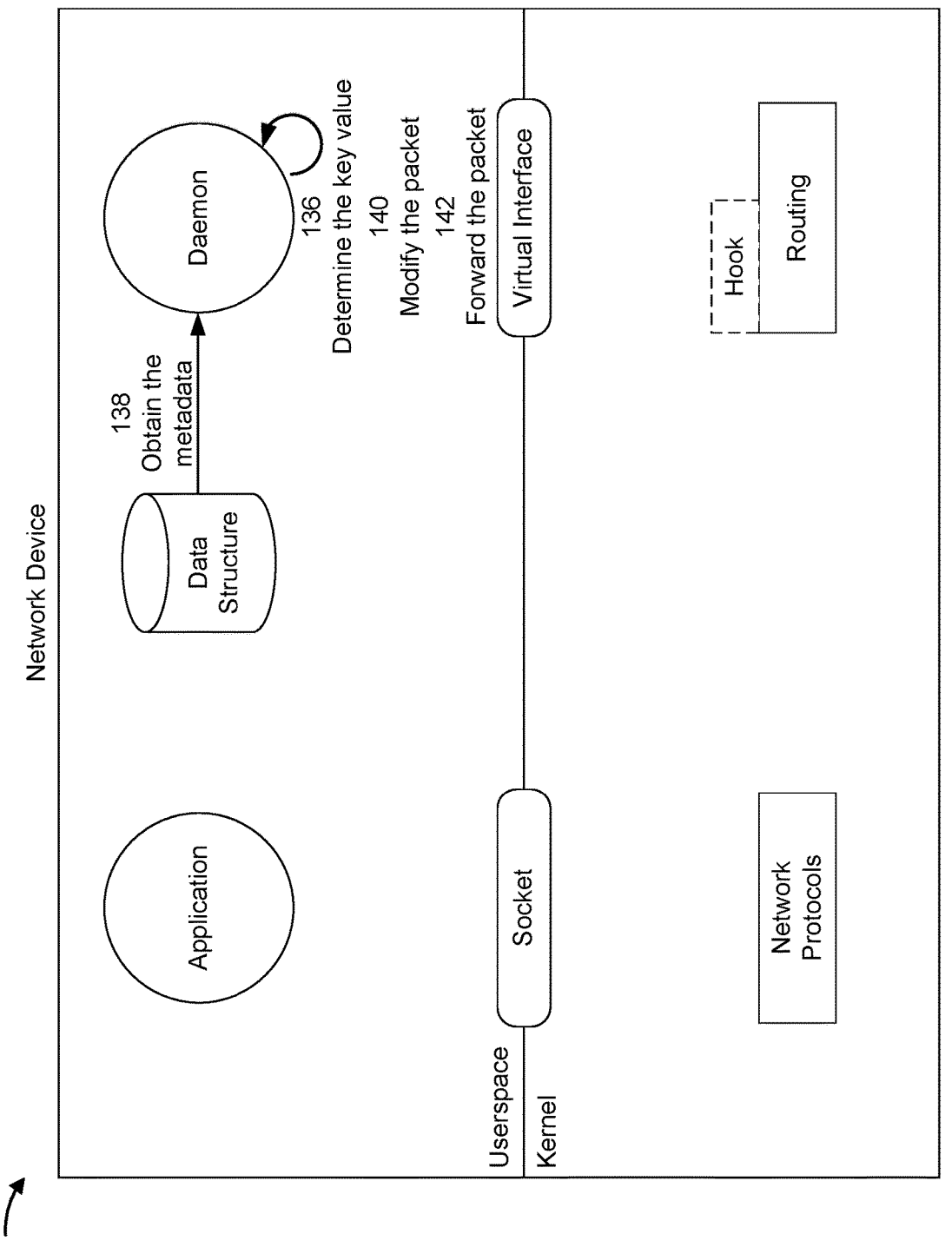

As shown in FIG. 1F, and by reference number 136, the network device, using the daemon of the userspace, may determine the key value (e.g., based on receiving the packet). For example, the network device (e.g., using the daemon) may process the packet to remove the key value from the packet (e.g., from the end of the packet), and may thereby determine the key value.

As shown by reference number 138, the network device, using the daemon of the userspace, may obtain the metadata (e.g., that is associated with the packet). In some implementations, the network device (e.g., using the daemon) may obtain the metadata from the data structure based on the key value. For example, the network device (e.g., using the daemon) may search the data structure for an entry associated with the key value (e.g., for an entry keyed to or indexed with the key value), may thereby identify the entry associated with the key value, and may process (e.g., parse and/or read) the entry to obtain the metadata from the entry. In this way, the metadata may be passed (e.g., from the application to the daemon) within the userspace of the network device, without passing into the kernel of the network device.

As shown by reference number 140, the network device, using the daemon of the userspace, may modify the packet. For example, the network device (e.g., using the daemon) may include the metadata in one or more headers of the packet (e.g., encapsulate the packet with the metadata).

As shown by reference number 142, the network device, using the daemon of the userspace, may forward the packet. In some implementations, the network device (e.g., using the daemon) may forward the packet based on the metadata (e.g., that is included in the packet). For example, when the metadata includes information that identifies the packet's destination, or a route associated with the packet's destination, the network device (e.g., using the daemon) may forward the packet in accordance with that information.

As indicated above, FIGS. 1A-1F are provided as an example. Other examples may differ from what is described with regard to FIGS. 1A-1F.

Figure 2:
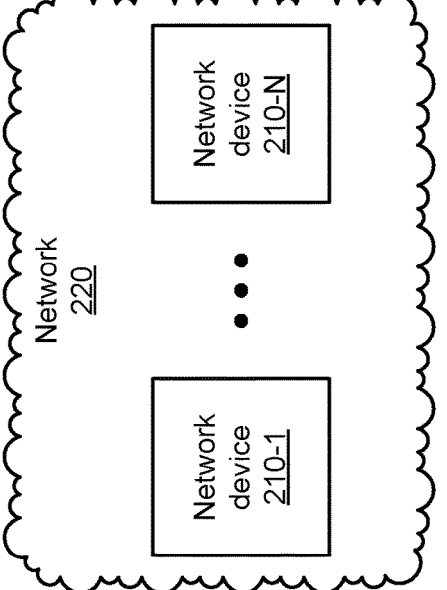
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include network devices 210 (shown as network device 210-1 through network device 210-N) and a network 220. Devices of environment 200 may interconnect via wired connections, wireless connections, or a combination of wired and wireless connections.

Network device 210 includes one or more devices capable of receiving, processing, storing, routing, and/or providing traffic (e.g., a packet or other information, data, or metadata) in a manner described herein. For example, network device 210 may include a router, such as a label switching router (LSR), a label edge router (LER), an ingress router, an egress router, a provider router (e.g., a provider edge router or a provider core router), a virtual router, or another type of router. Additionally, or alternatively, network device 210 may include a gateway, a switch, a firewall, a hub, a bridge, a reverse proxy, a server (e.g., a proxy server, a cloud server, or a data center server), a load balancer, and/or a similar device. In some implementations, network device 210 may be a physical device implemented within a housing, such as a chassis. In some implementations, network device 210 may be a virtual device implemented by one or more computer devices of a cloud computing environment or a data center. In some implementations, a group of network devices 210 may be a group of data center nodes that are used to route traffic flow through network 220.

Network 220 includes one or more wired and/or wireless networks. For example, network 220 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
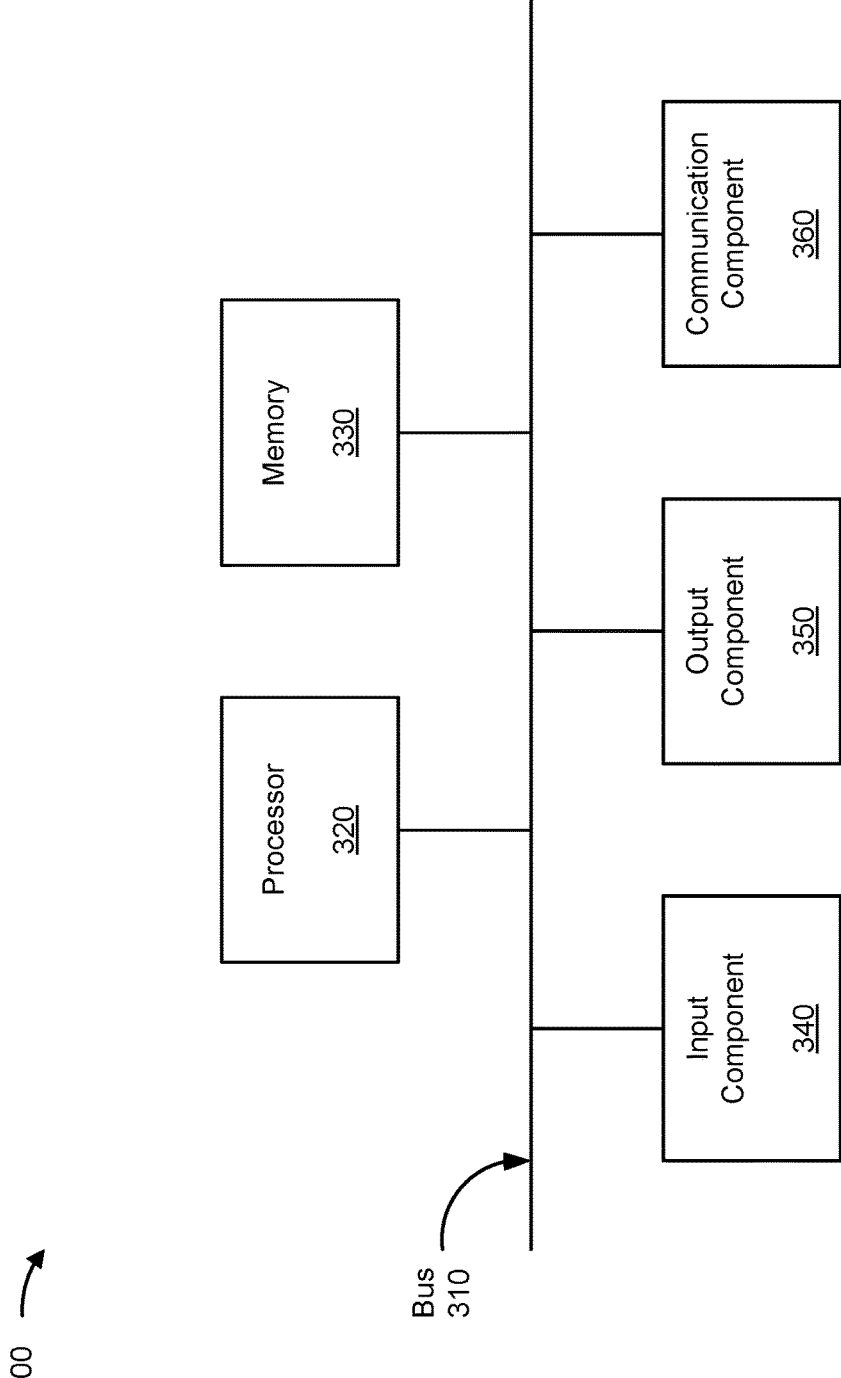
FIG. 3 is a diagram of example components of a device associated with passing metadata associated with a packet within a userspace of a network device.

FIG. 3 is a diagram of example components of a device 300 associated with passing metadata associated with a packet within a userspace of a network device. The device 300 may correspond to network device 210. In some implementations, network device 210 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
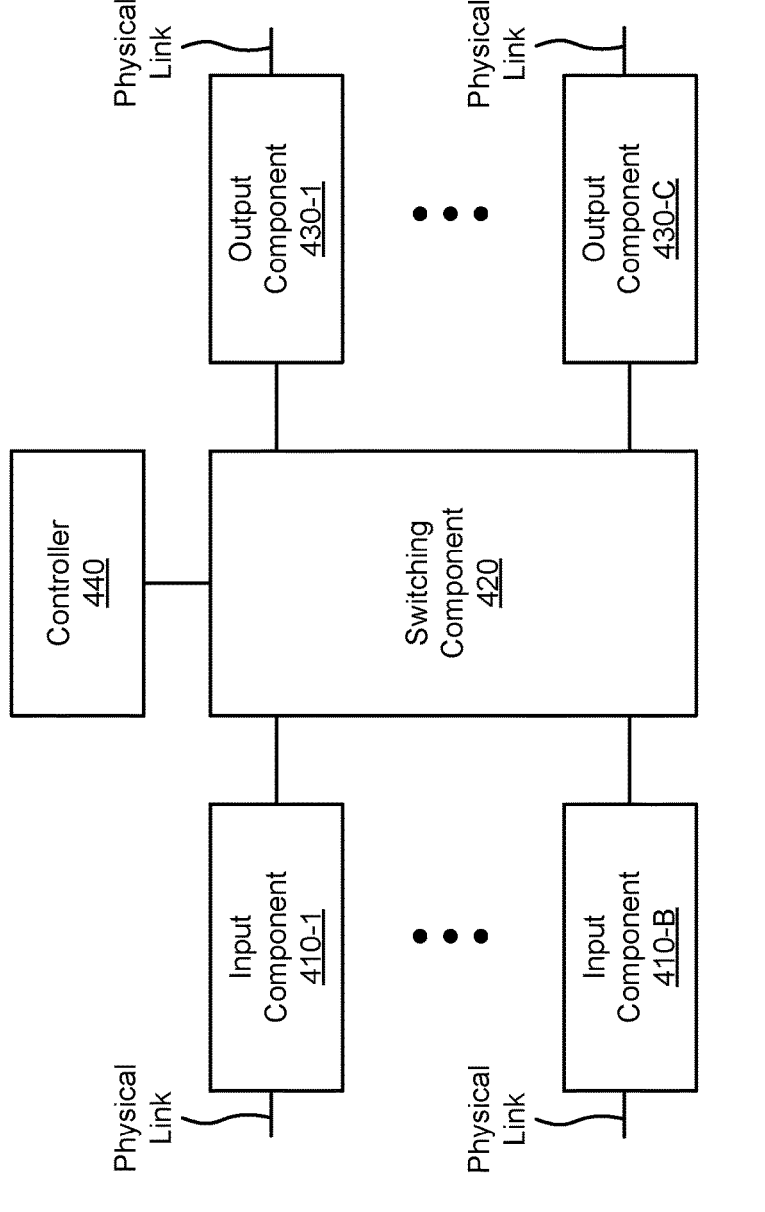
FIG. 4 is a diagram of example components of a device associated with passing metadata associated with a packet within a userspace of a network device.

FIG. 4 is a diagram of example components of a device 400 associated with passing metadata associated with a packet within a userspace of a network device. Device 400 may correspond to network device 210. In some implementations, network device 210 may include one or more devices 400 and/or one or more components of device 400. As shown in FIG. 4, device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

Input component 410 may be one or more points of attachment for physical links and may be one or more points of entry for incoming traffic, such as packets. Input component 410 may process incoming traffic, such as by performing data link layer encapsulation or decapsulation. In some implementations, input component 410 may transmit and/or receive packets. In some implementations, input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 410.

Switching component 420 may interconnect input components 410 with output components 430. In some implementations, switching component 420 may be implemented via one or more crossbars, via busses, and/or with shared memories. The shared memories may act as temporary buffers to store packets from input components 410 before the packets are eventually scheduled for delivery to output components 430. In some implementations, switching component 420 may enable input components 410, output components 430, and/or controller 440 to communicate with one another.

Output component 430 may store packets and may schedule packets for transmission on output physical links. Output component 430 may support data link layer encapsulation or decapsulation, and/or a variety of higher-level protocols. In some implementations, output component 430 may transmit packets and/or receive packets. In some implementations, output component 430 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 430. In some implementations, input component 410 and output component 430 may be implemented by the same set of components (e.g., and input/output component may be a combination of input component 410 and output component 430).

Controller 440 includes a processor in the form of, for example, a CPU, a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor. The processor is implemented in hardware, firmware, or a combination of hardware and software. In some implementations, controller 440 may include one or more processors that can be programmed to perform a function.

In some implementations, controller 440 may include a RAM, a ROM, and/or another type of dynamic or static storage device (e.g., a flash memory, a magnetic memory, an optical memory, etc.) that stores information and/or instructions for use by controller 440.

In some implementations, controller 440 may communicate with other devices, networks, and/or systems connected to device 400 to exchange information regarding network topology. Controller 440 may create routing tables based on the network topology information, may create forwarding tables based on the routing tables, and may forward the forwarding tables to input components 410 and/or output components 430. Input components 410 and/or output components 430 may use the forwarding tables to perform route lookups for incoming and/or outgoing packets.

Controller 440 may perform one or more processes described herein. Controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 440 from another computer-readable medium or from another device via a communication interface. When executed, software instructions stored in a memory and/or storage component associated with controller 440 may cause controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIG. 5 is a flowchart of an example process 500 associated with passing metadata associated with a packet within a userspace of a network device. In some implementations, one or more process blocks of FIG. 5 are performed by a network device (e.g., network device 210). In some implementations, one or more process blocks of FIG. 5 are performed by another device or a group of devices separate from or including the network device, such as another network device. Additionally, or alternatively, one or more process blocks of FIG. 5 may be performed by one or more components of device 300, such as processor 320, memory 330, input component 340, output component 350, and/or communication component 360; one or more components of device 400, such as input component 410, switching component 420, output components 430, and/or controller 440; and/or one or more other components.

As shown in FIG. 5, process 500 may include identifying, using a daemon of a userspace of the network device, a packet (block 510). For example, the network device may identify, using a daemon of a userspace of the network device, a packet, as described above.

As further shown in FIG. 5, process 500 may include processing, using the daemon of the userspace, the packet to determine metadata associated with the packet (block 520). For example, the network device may process, using the daemon of the userspace, the packet to determine metadata associated with the packet, as described above.

As further shown in FIG. 5, process 500 may include storing, using the daemon of the userspace, the metadata and a key value in a data structure (block 530). For example, the network device may store, using the daemon of the userspace, the metadata and a key value in a data structure, as described above.

As further shown in FIG. 5, process 500 may include providing, using the daemon of the userspace, the packet to a kernel of the network device via a virtual interface between the userspace and the kernel (block 540). For example, the network device may provide, using the daemon of the userspace, the packet to a kernel of the network device via a virtual interface between the userspace and the kernel, as described above. In some implementations, providing the packet to the kernel of the network device allows the network device, when using the kernel, to process the packet and to provide the packet to an application of the userspace via a socket. In some implementations, storing the metadata and the key value in the data structure allows the network device, when using the application of the userspace, to retrieve the metadata from the data structure based on receiving the packet from the kernel via the socket.

Process 500 may include additional implementations, such as any single implementation or any combination of implementations described below and/or in connection with one or more other processes described elsewhere herein.

In a first implementation, storing the metadata comprises processing, using the daemon of the userspace and using a hashing technique, the packet to determine the key value, and storing, using the daemon of the userspace, the metadata and the key value in an entry of the data structure.

In a second implementation, alone or in combination with the first implementation, providing, when using the kernel, the packet to the application of the userspace via the socket allows the network device, when using the application, to process, using the hashing technique, the packet to determine the key value; obtain, based on the key value, the metadata from the data structure, and forward, based on the metadata, the packet.

In a third implementation, alone or in combination with one or more of the first and second implementations, providing the packet to the kernel of the network device comprises processing, using the daemon of the userspace, the packet to include the key value, and providing, using the daemon of the userspace, the packet to the kernel of the network device via the virtual interface.

In a fourth implementation, alone or in combination with one or more of the first through third implementations, providing the packet to the kernel of the network device allows the network device, when using the kernel, to process the packet to remove the key value from the packet, and provide the packet and ancillary data that indicates the key value to the application of the userspace via the socket.

In a fifth implementation, alone or in combination with one or more of the first through fourth implementations, providing the packet and the ancillary data to the application of the userspace via the socket allows the network device, when using the application, to obtain, based on the key value, the metadata from the data structure, and forward, based on the metadata, the packet.

In a sixth implementation, alone or in combination with one or more of the first through fifth implementations, process 500 includes receiving, using the daemon of the userspace, another packet from the kernel of the network device via the virtual interface, wherein the other packet includes another key value; processing, using the daemon of the userspace, the packet to remove the other key value from the other packet; obtaining, using the daemon of the userspace and based on the other key value and from the data structure, other metadata associated with the other packet; modifying, using the daemon of the userspace and based on the other metadata, the other packet; and forwarding, using the daemon of the userspace, the modified other packet.

Although FIG. 5 shows example blocks of process 500, in some implementations, process 500 includes additional blocks, fewer blocks, different blocks, or differently arranged blocks than those depicted in FIG. 5. Additionally, or alternatively, two or more of the blocks of process 500 may be performed in parallel.

FIG. 6 is a flowchart of an example process 600 associated with passing metadata associated with a packet within a userspace of a network device. In some implementations, one or more process blocks of FIG. 6 are performed by a network device (e.g., network device 210). In some implementations, one or more process blocks of FIG. 6 are performed by another device or a group of devices separate from or including the network device, such as another network device. Additionally, or alternatively, one or more process blocks of FIG. 6 may be performed by one or more components of device 300, such as processor 320, memory 330, input component 340, output component 350, and/or communication component 360; one or more components of device 400, such as input component 410, switching component 420, output components 430, and/or controller 440; and/or one or more other components.

As shown in FIG. 6, process 600 may include receiving, using an application of a userspace of the network device, a packet from a kernel of the network device via a socket (block 610). For example, the network device may receive, using an application of a userspace of the network device, a packet from a kernel of the network device via a socket, as described above.

As further shown in FIG. 6, process 600 may include determining, using the application of the userspace and based on receiving the packet, a key value (block 620). For example, the network device may determine, using the application of the userspace and based on receiving the packet, a key value, as described above.

As further shown in FIG. 6, process 600 may include obtaining, using the application of the userspace and based on the key value and from a data structure, metadata associated with the packet (block 630). For example, the network device may obtain, using the application of the userspace and based on the key value and from a data structure, metadata associated with the packet, as described above.

As further shown in FIG. 6, process 600 may include forwarding, using the application of the userspace and based on the metadata, the packet (block 640). For example, the network device may forward, using the application of the userspace and based on the metadata, the packet, as described above.

Process 600 may include additional implementations, such as any single implementation or any combination of implementations described below and/or in connection with one or more other processes described elsewhere herein.

In a first implementation, determining the key value includes processing, using the application of the userspace and using a hashing technique, the packet to determine the key value.

In a second implementation, alone or in combination with the first implementation, determining the key value includes receiving, using the application of the userspace and in association with receiving the packet, ancillary data that indicates the key value from the kernel via the socket, and processing, using the application of the userspace, the ancillary data to determine the key value.

In a third implementation, alone or in combination with one or more of the first and second implementations, the packet was provided to the kernel of the network device by the network device, using a daemon of the userspace, and via a virtual interface between the userspace and the kernel.

In a fourth implementation, alone or in combination with one or more of the first through third implementations, the network device, using a daemon of the userspace, stored the metadata and the key value in the data structure prior to the network device, using the application of the userspace, receiving the packet.

In a fifth implementation, alone or in combination with one or more of the first through fourth implementations, process 600 includes identifying, using the application of the userspace, another packet; determining, using the application of the userspace, other metadata associated with the other packet; storing, using the application of the userspace, the other metadata and another key value in the data structure; and providing, using the application of the userspace, the other packet and ancillary data that indicates the other key value to the kernel of the network device via the socket.

In a sixth implementation, alone or in combination with one or more of the first through fifth implementations, providing the other packet and the ancillary data to the kernel of the network device allows the network device, when using the kernel, to include the other key value in the other packet, and to provide the other packet to a daemon of the userspace via a virtual interface between the userspace and the kernel.

Although FIG. 6 shows example blocks of process 600, in some implementations, process 600 includes additional blocks, fewer blocks, different blocks, or differently arranged blocks than those depicted in FIG. 6. Additionally, or alternatively, two or more of the blocks of process 600 may be performed in parallel.

FIG. 7 is a flowchart of an example process 700 associated with passing metadata associated with a packet within a userspace of a network device. In some implementations, one or more process blocks of FIG. 7 are performed by a network device (e.g., network device 210). In some implementations, one or more process blocks of FIG. 7 are performed by another device or a group of devices separate from or including the network device, such as another network device. Additionally, or alternatively, one or more process blocks of FIG. 7 may be performed by one or more components of device 300, such as processor 320, memory 330, input component 340, output component 350, and/or communication component 360; one or more components of device 400, such as input component 410, switching component 420, output components 430, and/or controller 440; and/or one or more other components.

As shown in FIG. 7, process 700 may include receiving, using a kernel of the network device, a packet from a daemon of a userspace of the network device via a virtual interface between the userspace and the kernel (block 710). For example, the network device may receive, using a kernel of the network device, a packet from a daemon of a userspace of the network device via a virtual interface between the userspace and the kernel, as described above.

As further shown in FIG. 7, process 700 may include processing, using the kernel of the network device, the packet (block 720). For example, the network device may process, using the kernel of the network device, the packet, as described above.

As further shown in FIG. 7, process 700 may include providing, using the kernel of the network device, and based on processing the packet, the packet to an application of the userspace via a socket (block 730). For example, the network device may provide, using the kernel of the network device, and based on processing the packet, the packet to an application of the userspace via a socket, as described above.

Process 700 may include additional implementations, such as any single implementation or any combination of implementations described below and/or in connection with one or more other processes described elsewhere herein.

In a first implementation, providing the packet to the application of the userspace allows the network device, when using the application of the userspace, to obtain metadata associated with the packet from a data structure, and to forward the packet based on the metadata.

In a second implementation, alone or in combination with the first implementation, the packet includes a key value and processing, using the kernel of the network device, the packet includes processing, using the kernel of the network device, the packet to remove the key value from the packet, and providing, using the kernel of the network device, the packet and ancillary data that indicates the key value to the application of the userspace via the socket.

In a third implementation, alone or in combination with one or more of the first and second implementations, providing the packet and the ancillary data to the application of the userspace via the socket allows the network device, when using the application, to obtain, based on the key value, metadata associated with the packet from a data structure, and forward, based on the metadata, the packet.

In a fourth implementation, alone or in combination with one or more of the first through third implementations, process 700 includes receiving, using the kernel of the network device, another packet and ancillary data that indicates a key value from the application of the userspace via the userspace; processing, using the kernel of the network device, the other packet to include the key value; and providing, using the kernel of the network device and based on processing the other packet to include the key value, the other packet to the daemon of the network device via the virtual interface.

In a fifth implementation, alone or in combination with one or more of the first through fourth implementations, providing the other packet to the daemon of the userspace allows the network device, when using the daemon of the userspace, to obtain metadata associated with the other packet from a data structure, to modify the other packet based on the metadata, and to forward the modified other packet.

Although FIG. 7 shows example blocks of process 700, in some implementations, process 700 includes additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, traffic or content may include a set of packets. A packet may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
identifying, by a network device, using a daemon of a userspace of the network device, a packet;
processing, by the network device, using the daemon of the userspace, the packet to determine metadata associated with the packet;
storing, by the network device, using the daemon of the userspace, the metadata and a key value in a data structure; and
providing, by the network device, using the daemon of the userspace, the packet to a kernel of the network device via a virtual interface between the userspace and the kernel, wherein providing the packet to the kernel of the network device allows the network device, when using the kernel, to process the packet and to provide the packet to an application of the userspace via a socket, and
wherein storing the metadata and the key value in the data structure allows the network device, when using the application of the userspace, to retrieve the metadata from the data structure based on receiving the packet from the kernel via the socket;
receiving, using the daemon of the userspace, another packet that includes another key value from the kernel of the network device via the virtual interface;
processing, using the daemon of the userspace, the packet to remove the other key value from the other packet;
obtaining, using the daemon of the userspace and based on the other key value and from the data structure, other metadata associated with the other packet;
modifying, using the daemon of the userspace, the other packet based at least in part on the other metadata associated with the other packet; and
forwarding, using the daemon of the userspace, the modified other packet.

2. The method of claim 1,
wherein storing the metadata comprises:
processing, using the daemon of the userspace and using a hashing technique, the packet to determine the key value; and
storing, using the daemon of the userspace, the metadata and the key value in an entry of the data structure.

3. The method of claim 2,
wherein providing, when using the kernel, the packet to the application of the userspace via the socket allows the network device, when using the application, to:
process, using the hashing technique, the packet to determine the key value;
obtain, based on the key value, the metadata from the data structure; and
forward, based on the metadata, the packet.

4. The method of claim 1,
wherein providing the packet to the kernel of the network device comprises:
processing, using the daemon of the userspace, the packet to include the key value; and
providing, using the daemon of the userspace, the packet to the kernel of the network device via the virtual interface.

5. The method of claim 4,
wherein providing the packet to the kernel of the network device allows the network device, when using the kernel, to:
process the packet to remove the key value from the packet; and
provide the packet and ancillary data that indicates the key value to the application of the userspace via the socket.

6. The method of claim 5,
wherein providing the packet and the ancillary data to the application of the userspace via the socket allows the network device, when using the application, to:
obtain, based on the key value, the metadata from the data structure; and
forward, based on the metadata, the packet.

7. A network device, comprising:
one or more memories; and
one or more processors to:

receive, using an application of a userspace of the network device, a packet from a kernel of the network device via a socket, determine, using the application of the userspace and based on receiving the packet, a key value;

obtain, using the application of the userspace and based on the key value and from a data structure, metadata associated with the packet;

forward, using the application of the userspace and based on the metadata, the packet;

identify, using the application of the userspace, another packet;

determine, using the application of the userspace, other metadata associated with the other packet;

store, using the application of the userspace, the other metadata and another key value in the data structure; and provide, using the application of the userspace, the other packet and ancillary data that indicates another key value to the kernel of the network device via the socket.

8. The network device of claim 7, wherein the one or more processors, to determine the key value, are to:

process, using the application of the userspace and using a hashing technique, the packet to determine the key value.

9. The network device of claim 7, wherein the one or more processors, to determine the key value, are to:

receive, using the application of the userspace and in association with receiving the packet, ancillary data that indicates the key value from the kernel via the socket; and process, using the application of the userspace, the ancillary data to determine the key value.

10. The network device of claim 7, wherein the packet was provided to the kernel of the network device by the network device, using a daemon of the userspace, and via a virtual interface between the userspace and the kernel.

11. The network device of claim 7, wherein the network device, using a daemon of the userspace, stored the metadata and the key value in the data structure prior to the network device, using the application of the userspace, receiving the packet.

12. The network device of claim 7, wherein providing the other packet and the ancillary data to the kernel of the network device allows the network device, when using the kernel, to include the other key value in the other packet, and to provide the other packet to a daemon of the userspace via a virtual interface between the userspace and the kernel.

13. A non-transitory computer-readable medium storing a set of instructions, the set of instructions comprising:

one or more instructions that, when executed by one or more processors of a network device, cause the network device to:

receive, using a kernel of the network device, a packet that includes a key value from a daemon of a userspace of the network device via a virtual interface between the userspace and the kernel;

process, using the kernel of the network device, the packet to remove the key value from the packet;

provide, using the kernel of the network device, and based on processing the packet, the packet and ancillary data that indicates the key value to an application of the userspace via a socket;

receive, using the kernel of the network device, another packet from the application of the userspace via the userspace; and provide, using the kernel of the network device and based on processing the other packet to include a key value, the other packet to the daemon of the network device via the virtual interface.

14. The non-transitory computer-readable medium of claim 13, wherein providing the packet to the application of the userspace allows the network device, when using the application of the userspace, to obtain metadata associated with the packet from a data structure, and to forward the packet based on the metadata.

15. The non-transitory computer-readable medium of claim 13, wherein providing the packet and the ancillary data to the application of the userspace via the socket allows the network device, when using the application, to:

obtain, based on the key value, metadata associated with the packet from a data structure; and forward, based on the metadata, the packet.

16. The non-transitory computer-readable medium of claim 13, wherein the one or more instructions, to cause the network device to provide the other packet to the daemon of the network device via the virtual interface when executed by the one or more processors, further cause the network device to:

receive, using the kernel of the network device, ancillary data that indicates a key value from the application of the userspace via the userspace; and process, using the kernel of the network device, the other packet to include the key value.

17. The non-transitory computer-readable medium of claim 16, wherein providing the other packet to the daemon of the userspace allows the network device, when using the daemon of the userspace, to obtain metadata associated with the other packet from a data structure, to modify the other packet based on the metadata, and to forward the modified other packet.

18. The method of claim 1, wherein the metadata comprises one or more of: type length value (TLV) metadata, information that identifies a destination of the packet, and route information associated with the destination.

19. The network device of claim 7, wherein the metadata comprises one or more of: type length value (TLV) metadata, information that identifies a destination of the packet, and route information associated with the destination.

20. The non-transitory computer-readable medium of claim 15, wherein the metadata comprises one or more of: type length value (TLV) metadata, information that identifies a destination of the packet, and route information associated with the destination.

* * * * *